Nov. 23, 1965    V. SANTARELLI    3,219,278
SHUT-OFF NOZZLE
Filed Feb. 5, 1964
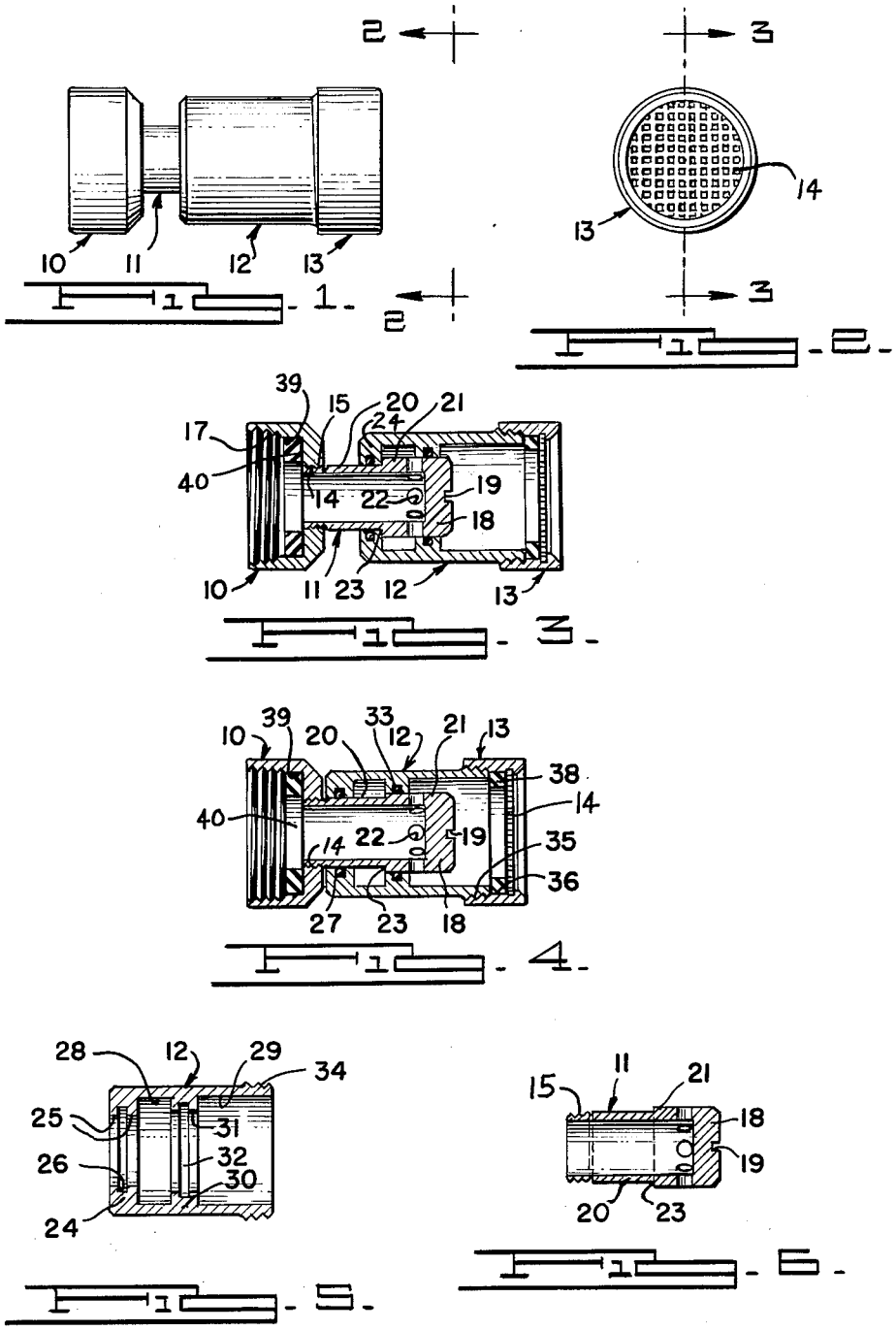
INVENTOR.
VINCENT SANTARELLI
BY
Donnelly, Mentag & Harrington
ATTORNEYS

Header omitted

3,219,278
SHUT-OFF NOZZLE
Vincent Santarelli, 27551 Gail, Warren, Mich.
Filed Feb. 5, 1964, Ser. No. 342,751
8 Claims. (Cl. 239—579)

This invention relates to valves for fluid pressure lines and particularly to a slide type valve suitable for use in a shut-off nozzle or spray head.

Priorly, numerous forms of slide valves have been employed in fluid pressure lines. These devices, however, are complex, expensive and difficult to assemble. Accordingly, it is an object of this invention to provide a new and improved fluid spray head.

It is another object of this invention to provide in a fluid system a slide type valve which is simple in construction and economical to manufacture.

Still another object of this invention is to provide an improved slide type valve structure for a fluid system such as a spray head.

Briefly, in accordance with aspects of this invention, I provide in a spray head an input member which is cylindrical and an output member which is also cylindrical and encircles the input member in sliding fluid sealing relationship, the input member having an endwall, a first section having a predetermined diameter and a second second section having a smaller diameter, the first section being adjacent the endwall and having fluid passages radially therethrough. The junction between the first and second sections is defined by a radially projecting shoulder. Advantageously, the outlet member has a pair of inwardly projecting circular portions, one portion slidably engaging the second or reduced section of the first member and a second portion slidably engaging the first or enlarged section of the first member, each projection compressively retaining a fluid seal against the first member in fluid sealing relationship while permitting sliding engagement. Also advantageously, this fluid flow device includes a coupling member on one end of the first member remote from the endwall, which coupling member acts as a stop for the sliding second member, thus the sliding second member slides between positions of engagement with the coupling member to a position engaging the shoulder defining the junction of the first and second sections of the first member. In accordance with still other features of this invention, the output member has a reticulated endwall and means securing the endwall against the second member. The resulting combination is a very simple structure which is easy to manufacture and easy to move from an "on" to an "off" position to control fluid flow.

These and various other objects and features of the invention will be more clearly understood from a reading of the detailed description of the invention in conjunction with the drawing illustrating the preferred embodiment of the invention in which:

FIGURE 1 is a view, in elevation, of a preferred embodiment of this invention;

FIGURE 2 is an end view of the embodiment of FIGURE 1, taken along the line 2—2 of FIGURE 1, and looking in the direction of the arrows;

FIGURE 3 is a sectional view, in elevation, taken along the line 3—3 of FIGURE 2, looking in the direction of the arrows, and showing the slide valve in a closed position;

FIGURE 4 is a view corresponding to FIGURE 3, showing the valve in the open position;

FIGURE 5 is a sectional view, in elevation, of a portion of the valve shown in FIGURES 1, 3 and 4; and FIGURE 6 is a sectional view, in elevation, of another portion of the embodiment shown in FIGURES 1, 3 and 4.

Referring now to FIGURE 1, there is depicted a preferred embodiment of this invention in which a cylindrical coupling member 10 is connected to a cylindrical first conduit member 11 and the first conduit member 11 is encircled and slidably engaged by a second conduit member 12. The conduit member 12 is engaged by a coupling or end member 13. All of these elements are cylindrical and are positioned such that they are symmetrical about a horizontal axis.

FIGURE 2 shows an end view of the embodiment of FIGURE 1 taken along the line 2—2. As therein indicated, the end member 13 has mounted therein a circular reticulated endwall or screen 14.

Referring now to FIGURES 3 and 4, there are depicted views in elevation and in section taken along the line 3—3 of FIGURE 2 and showing the valve in its closed and open positions, respectively. The member 11 is connected to the member 10 by means of threads 15 on the member 11 which threadably engage the member 10. The connecting member 10 is threaded on its inner surface as indicated at 17 to receive a suitable coupling such as a threaded pipe of the type employed for a sink to supply a mixture of hot and cold water in any combination. The member 11 includes an endwall 18 on the end remote from the coupling member 10, which endwall has a slot 19 therein so that the member 11 may be rotated relative to member 10 by means of a screwdriver inserted in the slot 19. The member 11 has a first or reduced section or portion 20 and a second section or portion 21 which is enlarged or has a greater diameter than the portion 20. The enlarged portion 21 has a plurality of fluid passages 22 extending radially therethrough. The junction of the reduced portion 20 and the enlarged portion 21 is defined by a substantially perpendicular, radially projecting shoulder 23 which limits the sliding of the sliding section 12 in a manner which will be subsequently described.

The member 12 includes a first inwardly projecting portion 24 on the left-hand end thereof, as viewed in FIGURES 3, 4 and 5, and this inward projection is defined by a pair of radially extending shoulders 25 spaced apart by an annular groove 26 which receives a fluid sealing gasket such as O-ring 27 (FIGURES 3 and 4). Adjacent the inwardly projecting portion 24 on the inner surface of the member 12 is a cylindrical chamber 28 which terminates in a second inwardly projecting portion 30 between the chamber 28 and a similar chamber 29. The second inwardly projecting portion 30 is defined by a pair of inwardly projecting annular shoulders 31 separated by an annular groove 32 which groove also receives a fluid seal in the form of an O-ring 33.

Advantageously, the shoulders 25 project further inwardly, or have a smaller diameter than the shoulders 31 of the projection 30. Thus, the first inward projection 24 and, more specifically, the shoulders 25 thereof and the gasket 27 define a fluid sealing sliding engagement with a reduced portion 20 of the first member 11. Similarly, the second inward projection 30 and, more specifically, the annular shoulders 31 thereof and the gasket 33 define a fluid sealing sliding engagement with the enlarged portion 21 of the member 11.

When the second member 12 is in its right-hand terminal position in which the inward projection 25 engages the shoulder 23, the fluid seal defined by projection 30 and gasket 33 is in engagement with the endwall 18 and thus fluid entering the member 10 and passing through the member 11 and passages 22 reaches the chamber 28 but cannot pass through the member 12. If, however, the member 12 is slid leftwardly until the projection 24 engages the member 10, as shown in FIGURE 4, the fluid passages 22 are in communication with the chamber 29 to thus permit fluid flow from the element 10 through the elements 11, 12 and through the reticulated member 14. It is, of course, understood that the fluid flow may be reversed through the valve and it is not essential that the reticulated member 14 be employed to produce a spray head but the reticulated screen may be omitted and the members 10, 12 coupled to suitable fluid conduits and the sliding valve arrangement employed to control the flow between the connected conduits.

The details of the member 11 are best seen in FIGURE 6 which shows the threaded end 15 which is threaded for engagement with the member 10. FIGURE 6 also shows the reduced portion 20, the enlarged portion 21 and the shoulder 23 defining the junction between the portions 20, 21, the endwall 18 and the screwdriver slot 19.

The annular member 13 is threaded at 35 to engage member 12 and includes a cylindrical inner chamber 36 which receives a resilient fluid sealing gasket 38. The gasket 38 is compressed between the reticulated member 14 and member 12 and securely retains the reticulated screen 14 in position against the inwardly projecting edge of the member 13. The coupling member 10 includes an annular chamber 39 in which is inserted a resilient fluid sealing gasket 40.

It will thus be apparent that this flow control device is very simple in construction and very economical to build and highly satisfactory in operation. As previously mentioned, the device is particularly suitable as a spray head of the type commonly employed in sinks in which a combination of hot and cold water is fed to the sink; however, by eliminating the reticulated screen, the device may be employed in a flow control system whenever a sliding type valve is suitable. Alternately, the device may be reversed, i.e., the reticulated member 14 mounted in the member 10 and the member 12 employed as the inlet member with the member 11 acting as the outlet member.

While I have shown and described one preferred embodiment of this invention, it is understood that the concepts thereof may be applied to other embodiments without departing from the spirit and scope of this invention.

What is claimed is:

1. A spray nozzle comprising:
   (a) a first cylindrical member defining an inlet passage for said nozzle and having an opening on one end thereof and an endwall on the opposite end thereof;
   (b) said member having a first cylindrical portion of one diameter in the region adjacent said opening and a second portion of larger diameter in the region adjacent said endwall;
   (c) a radially extending shoulder defining the junction between said portions;
   (d) fluid passage means extending radially through said second portion;
   (e) coupling means connected to said first member in the region of said opening and having a radial extension thereon; and,
   (f) a second cylindrical member slidably mounted on said first member and movable axially between "on" and "off" positions, and having an inner diameter larger than said second portion of said first member and acting as an outlet member for said nozzle, said second member including a first annular inwardly projecting portion slidably engaging said first portion of said first member and a second annular inwardly projecting portion slidably engaging said second portion of said inlet member and engageable with said radially extending shoulder on said first cylindrical member when the second cylindrical member is moved axially in one direction to the "off" position and engageable with said radial extension on said coupling meanas when the second cylindrical member is moved axially in the opposite direction to the "on" position.

2. A nozzle according to claim 1 further including:
   (a) fluid sealing means in each of said inwardly projecting portions.

3. The combination according to claim 1 further including:
   (a) a perforated member defining an end member for said outlet member.

4. The combination according to claim 1 including:
   (a) a circular reticulated member defining an endwall of said outlet member; and,
   (b) an annular ring engaging said outlet member and said reticulated member.

5. A fluid flow control valve comprising:
   (a) a first cylindrical member having an opening on one end thereof and an endwall on the opposite end thereof;
   (b) said member having a first cylindrical portion of one diameter in the region adjacent said opening and a second portion of a larger diameter than said one diameter in the region adjacent said endwall;
   (c) a radial shoulder defining the junction between said portions;
   (d) aperture means through said second portion;
   (e) a second cylindrical member joined to said first member in the region of said opening and including a radial extension thereon; and,
   (f) a third cylindrical member slidably mounted on said first member and movable axially between "on" and "off" positions, and having an inner diameter larger than said second portion of said first member, said third member including a first inwardly projecting portion slidably engaging said first portion of said first member and a second inwardly projecting portion slidably engaging said second portion of said first member, said first inwardly projecting portion being engageable with said radial shoulder on said first member when the third cylindrical member is moved axially in one direction to the "off" position and engageable with the radial extension on said second cylindrical member when the third cylindrical member is moved axially in the opposite direction to the "on" position.

6. A fluid valve according to claim 5 further including:
   (a) fluid sealing means in each of said inwardly projecting portions.

7. A fluid valve according to claim 5 further including:
   (a) a reticulated member defining an end member for said third cylindrical member.

8. A fluid valve according to claim 5 including:
   (a) a reticulated member and an annular ring engaging said third cylindrical member and said reticulated member.

References Cited by the Examiner

UNITED STATES PATENTS

| | | | |
|---|---|---|---|
| 1,269,587 | 6/1918 | Enos | 251—325 |
| 2,509,671 | 5/1950 | Christensen | 251—324 |
| 2,529,223 | 11/1950 | Moen | 239—587 |
| 2,906,492 | 9/1959 | Conrad | 215—325 |
| 2,985,385 | 5/1961 | Bowers et al. | 239—583 |
| 3,003,703 | 10/1961 | Lambton | 239—587 |
| 3,113,725 | 12/1963 | Packard et al. | 239—583 |

EVERETT W. KIRBY, *Primary Examiner.*